United States Patent
Hayashida et al.

(10) Patent No.: US 11,242,264 B2
(45) Date of Patent: Feb. 8, 2022

(54) ALUMINA-BASED COMPOSITE OXIDE AND PRODUCTION METHOD FOR SAME

(71) Applicant: DAIICHI KIGENSO KAGAKU KOGYO CO., LTD., Osaka (JP)

(72) Inventors: Hiroyuki Hayashida, Osaka (JP); Yoshikazu Hirose, Osaka (JP)

(73) Assignee: DAIICHI KIGENSO KAGAKU KOGYO CO., LTD., Osaka (JP)

(*) Notice: Subject to any disclaimer, the term of this patent is extended or adjusted under 35 U.S.C. 154(b) by 591 days.

(21) Appl. No.: 16/069,211

(22) PCT Filed: Jun. 30, 2017

(86) PCT No.: PCT/JP2017/024174
§ 371 (c)(1),
(2) Date: Jul. 11, 2018

(87) PCT Pub. No.: WO2019/003424
PCT Pub. Date: Jan. 3, 2019

(65) Prior Publication Data
US 2020/0399139 A1 Dec. 24, 2020

(51) Int. Cl.
*C01G 25/00* (2006.01)

(52) U.S. Cl.
CPC ........ *C01G 25/006* (2013.01); *C01P 2006/12* (2013.01); *C01P 2006/14* (2013.01); *C01P 2006/16* (2013.01)

(58) Field of Classification Search
CPC ... B01J 23/02; B01J 23/54; B01J 23/64; B01J 23/8933; B01J 23/8946; B01J 23/8893; B01J 21/02; B01J 21/04; B01J 21/06; B01J 21/063; B01J 21/066; B01J 21/10; B01J 23/44; B01J 23/38; B01J 23/63; B01J 23/42; B01J 23/10; B01D 2253/00; B01D 2253/104; B01D 2253/1124; B01D 2253/308; B01D 2253/306; B01D 2253/311; B01D 2255/204; B01D 2255/2042; B01D 2255/2045; B01D 2255/2047; B01D 2255/2065; B01D 2255/207; B01D 2255/2092; B01D 2255/9205; B01D 2255/9207; C01P 2006/14; C01P 2006/16; C01P 2006/12; C01P 2006/13; C01P 2002/54; C01P 2002/52; C01P 2002/60; C01G 25/00; C01G 25/006
See application file for complete search history.

(56) References Cited

U.S. PATENT DOCUMENTS

| | | | |
|---|---|---|---|
| 4,868,150 A | 9/1989 | Spooner et al. | |
| 5,908,800 A | 6/1999 | Bonneau et al. | |
| 6,150,288 A | 11/2000 | Suzuki et al. | |
| 6,306,794 B1 | 10/2001 | Suzuki et al. | |
| 2002/0049137 A1 | 4/2002 | Morikawa et al. | |
| 2009/0023581 A1* | 1/2009 | Di Monte | B01J 37/02 502/263 |
| 2009/0258781 A1 | 10/2009 | Maruki et al. | |
| 2012/0129690 A1* | 5/2012 | Larcher | B01J 23/44 502/304 |
| 2012/0142523 A1 | 6/2012 | Sato et al. | |

FOREIGN PATENT DOCUMENTS

| | | |
|---|---|---|
| JP | 1-281145 A | 11/1989 |
| JP | 9-506587 A | 6/1997 |
| JP | 10-182155 A | 7/1998 |
| JP | 2002-331238 A | 11/2002 |
| JP | 2009-249275 A | 10/2009 |
| JP | 2014-552 A | 1/2014 |
| JP | 2014-24058 A | 2/2014 |
| JP | 2014-520741 A | 8/2014 |
| JP | 2014-522801 A | 9/2014 |
| JP | 2017-132663 A | 8/2017 |
| WO | 2012/067654 A1 | 5/2012 |
| WO | 2013/004456 A1 | 1/2013 |
| WO | 2013/007809 A1 | 1/2013 |
| WO | 2013/191298 A1 | 12/2013 |

OTHER PUBLICATIONS

International Search Report dated Sep. 19, 2017, issued in counterpart application No. PCT/JP2017/024174. (3 pages).
Written Opinion dated Sep. 19, 2017, issued in counterpart application No. PCT/JP2017/024174. (5 pages).
Extended (Supplementary) European Search Report dated Jan. 21, 2020, issued in counterpart application No. 17889537.1. (8 pages).
Written Opinion dated Sep. 19, 2017, issued in counterpart application No. PCT/JP2017/024174. (8 pages).

* cited by examiner

*Primary Examiner* — Smita S Patel

(74) *Attorney, Agent, or Firm* — Westerman, Hattori, Daniels & Adrian, LLP

(57) ABSTRACT

Provided is an alumina-based composite oxide having a large initial specific surface area and a small initial mean pore size, with excellent heat resistance of the specific surface area and pore volume; and a production method therefor. Specifically, provided is an alumina-based composite oxide wherein the initial crystallite diameter is 10 nm or less and the initial specific surface area is 80 $m^2$/ml or more; after calcination at 1200° C. for 3 hours in air, the specific surface area is 10 $m^2$/ml or more; the initial mean pore size is 10 nm or more and 50 nm or less; and after calcination at 1200° C. for 3 hours in air, the pore volume retention rate is 10% or more, which is determined by $(P_1/P_0) \times 100$ wherein $P_0$ represents an initial pore volume (ml/g), and $P_1$ represents a pore volume (ml/g) after calcination at 1200° C. for 3 hours in air.

7 Claims, No Drawings

ALUMINA-BASED COMPOSITE OXIDE AND
PRODUCTION METHOD FOR SAME

TECHNICAL FIELD

The present invention relates to alumina-based composite oxides useful as catalyst supports for exhaust-gas-purifying catalysts (exhaust-gas-purifying-catalyst supports) and production methods for the composite oxides.

BACKGROUND ART

Exhaust gas emitted from internal-combustion engines such as of automobiles and combustion engines of boilers contains toxic substances such as hydrocarbon (HC), carbon monoxide (CO), and nitrogen oxide (NOx). Thus, exhaust gas purification techniques that can purify these three components simultaneously have been an active area of research. Catalysts in this application are called "three-way catalysts" for exhaust gas, and are already in practical use.

Among three-way catalysts for exhaust gas, those for automobiles, in particular, are required to be capable of flexibly dealing with abrupt shifts in the concentration of toxic substances (e.g., CO, HC, and NOx) from a few ppm to a few percentages, and to purify the substances in a highly efficient manner.

Catalytic converters typically have a coating layer, which is formed by coating a honeycomb with slurry of a composite oxide on which precious metal is supported, and subjecting the coated film to drying and calcining steps. If the composite oxide support (powder) is bulky, the thickness of the coating layer increases. The increased thickness of the coating layer leads to pressure loss and decreases the flow volume of exhaust gas in the honeycomb, thereby reducing the engine power output and exhaust gas purification performance.

However, if the thickness of the coating layer is decreased in order to reduce the pressure loss resulting from the thickness of the coating layer, the catalyst amount is reduced, which in turn results in insufficient purification performance concerning toxic substances. Thus, in order to improve the purification performance of honeycombs, manufacturers have been putting effort into making a honeycomb that is thin, but that still maintains wall strength.

Regarding exhaust-gas-purifying-catalyst supports formed from a composite oxide, extensive research and development have been conducted on supports of catalysts for purifying automobile exhaust gas using alumina-based composite oxides.

For example, PTL 1 discloses a process for producing a composite oxide comprising preparing a plurality of aqueous solutions of metallic acid salts; adding the plurality of aqueous solutions successively to an alkali aqueous solution, which can neutralize the total amount of the metallic acid salts, thereby generating precipitates; and calcining the precipitates. This production process provides a composite oxide comprising agglomerated particles having a particle diameter of 20 µm or less wherein an oxide or a solid solution is dispersed in the agglomerated particles; the oxide or the solid solution is composed of, for example, $Al_2O_3$ $CeO_2$, and $ZrO_2$, and is in the form of fine particles having a diameter of 50 nm or less; and the agglomerated particles have a metallic element distribution that differs between the surface and the inner portion. When this composite oxide has a higher amount of, for example, $Al_2O_3$ on the surface, the concentration of $CeO_2$ on the surface decreases. This composite oxide can thus suppress the degradation of Rh when supporting Rh as a catalyst. PTL 1 also discloses that when precipitates are generated from an aqueous solution containing Al and La, $La_2O_3$ is solved in $Al_2O_3$, increasing the heat resistance of $Al_2O_3$; and $La_2O_3$ is not solved in $CeO_2$—$ZrO_2$, thus reducing the deterioration of oxygen storage-and-release ability (FIG. 1 of PTL 1).

PTL 2 discloses an exhaust gas-purifying-catalyst support containing a composite metal oxide porous material that contains 5 to 30 mass % of alumina, 25 to 39 mass % of ceria, and 33 to 51 mass % of zirconia, and teaches that the composite metal oxide porous material after calcination at 1100° C. for 5 hours in the air satisfies the following conditions: the standard deviations of the contents of aluminum element, cerium element, and zirconium element (unit: at %) in 100 microscopic regions (one microscopic region has a size of 300 nm in height×330 nm in length) determined by an energy dispersive X-ray analysis with a scanning transmission electron microscope equipped with a spherical aberration corrector are all 18.5 or less.

PTL 2 also discloses in claim 2 and paragraph [0101] thereof that the composite metal oxide porous material, after a high-temperature heating treatment, had mesopores with a pore size of 1 nm to 0.1 µm formed between primary particles (primary pores), and macropores with a pore size of 0.1 µm to 10 µm formed between secondary particles (secondary pores); and that the mesopore and the macropore were each confirmed to have a relatively large total pore volume.

PTL 3 discloses an exhaust-gas purifying-catalyst support composed of a composite metal oxide porous material that contains alumina, ceria, and zirconia, with an alumina content of 30 to 80 mass %, and teaches that the composite metal oxide porous material after calcination at 1100° C. for 5 hours in the air satisfies the following conditions: the standard deviations of the contents of aluminum element, cerium element, and zirconium element (unit: at %) in 100 microscopic regions (one microscopic region has a size of 300 nm in height×330 nm in length) determined by energy-dispersive X-ray analysis with a scanning transmission electron microscope equipped with a spherical aberration corrector are all 19 or less.

PTL 3 also discloses in paragraph [0093] that the composite metal oxide porous material, after a high-temperature heat treatment, had mesopores with a pore size of 1 nm to 0.1 µm formed between primary particles (primary pores), and macropores with a pore size of 0.1 µm to 10 µm formed between secondary particles (secondary pores); and that the mesopore and the macropore were each confirmed to have a relatively large total pore volume. PTL 3 further discloses that the formation of the macropores appeared to be due to the removal of a polymer dispersant during a degreasing treatment.

PTL 4 discloses a composite oxide obtained by a step of forming an oxide precursor in a short time from a salt solution of a plurality of elements and a calcining step of calcining the obtained precursor to form a composite oxide, and/or by forming a precursor from a highly concentrated salt solution and directly calcining the precursor; and teaches that each element is substantially homogeneously solved in each phase, and that when the composite oxide contains two or more phases, the phases are highly dispersed. PTL 4 also discloses a composite oxide support obtained by forming an oxide precursor composed of a plurality of elements from a salt solution of the plurality of elements in a short time, and calcining the obtained precursor. PTL 4 further discloses a composite oxide-containing catalyst formed by allowing a catalytically active metal to be present during the formation of the composite oxide precursor. PTL 4 discloses that the composite oxide has a wide range of applications in sensor materials, battery materials, catalyst materials, optical materials, semiconductor materials, structure materials, etc.; and that the composite oxide support and the composite oxide-containing catalyst can stably support precious metal, and are also useful as an exhaust gas catalyst excellent, for example, in sulfur toxicity tolerance.

CITATION LIST

Patent Literature

PTL 1: JP2002-331238A
PTL 2: JP2014-024058A
PTL 3: JP2014-000552A
PTL 4: JPH10-182155A

SUMMARY OF INVENTION

Technical Problem

Prior art such as PTL 1 to 4 increases macropores (>50 nm) in order to improve heat resistance of the specific surface area of an alumina-based composite oxide, which serves as an exhaust-gas-purifying-catalyst support, at a high temperature. However, this simultaneously increases the pore volume of the composite oxide, making the composite oxide bulky. As described above, the use of a bulky composite oxide, in the production of a catalytic converter, increases the thickness of a coating layer formed from slurry of the composite oxide that supports precious metal on the honeycomb, leading to pressure loss. To address this problem, attempts have been made to make the wall thickness of the honeycomb thin; however, there remain limitations in improvement in purification performance by decreasing the wall thickness, and it is also difficult to ensure high-temperature heat resistance of the honeycomb.

Therefore, the main object of the present invention is to provide an alumina-based composite oxide that has a large initial specific surface area, a small initial mean pore size, and excellent heat resistance of the specific surface area and pore volume; and a method for producing the alumina-based composite oxide.

Solution to Problem

The present inventors paid special attention to the fact that little effort has been placed on the development of a composite oxide used as a catalyst support that is compact and that exhibits enhanced purification performance, while maintaining the high-temperature heat resistance. The inventors conducted extensive research to solve the problems described above, and completed the present invention.
1. An alumina-based composite oxide, characterized in that the alumina-based composite oxide has an initial crystallite diameter of 10 nm or less and an initial specific surface area of 80 $m^2$/ml or more;
the alumina-based composite oxide after calcination at 1200° C. for 3 hours in air has a specific surface area of 10 $m^2$/ml or more;
the alumina-based composite oxide has an initial mean pore size of 10 nm or more and 50 nm or less; and
the alumina-based composite oxide after calcination at 1200° C. for 3 hours in air has a pore volume retention rate of 10% or more, the retention rate being represented by $(P_1/P_0) \times 100$ wherein $P_0$ represents an initial pore volume in ml/g, and $P_1$ represents a pore volume in ml/g after calcination at 1200° C. for 3 hours in air.
2. The alumina-based composite oxide according to item 1, wherein after calcination at 1200° C. for 3 hours in air, a specific surface area retention rate is 15% or more, the retention rate being determined by $(S_1/S_0) \times 100$ wherein $S_0$ represents an initial specific surface area in $m^2$/ml, and Si represents a specific surface area in $m^2$/ml after calcination at 1200° C. for 3 hours in air.
3. The alumina-based composite oxide according to item 1 or 2, wherein the alumina content is 20 wt % or more and 96 wt % or less.
4. The alumina-based composite oxide according to any one of items 1 to 3, comprising, in addition to the alumina, at least one oxide selected from the group consisting of 1) ceria, 2) zirconia, and 3) rare-earth oxides except for ceria and promethium oxide.
5. The alumina-based composite oxide according to any one of items 1 to 4, comprising, in addition to the alumina, at least one oxide selected from the group consisting of
A) an oxide of at least one element selected from the group consisting of In, Si, Sn, Bi, and P,
B) an oxide of a transition metal except for rare-earth elements and precious metal elements, and
C) an alkaline-earth metal oxide,
wherein the total content of the oxides represented by A) to C) is 0.1 wt % or more and 40 wt % or less.
6. The alumina-based composite oxide according to item 5, wherein the oxide of a transition metal is an oxide of at least one element selected from the group consisting of Ti, V, Cr, Mn, Fe, Co, Ni, Cu, Nb, Mo, Ta, and W.
7. The alumina-based composite oxide according to item 5, wherein the alkaline-earth metal oxide is an oxide of at least one element selected from the group consisting of Mg, Ca, Sr, and Ba.
8. A method for producing an alumina-based composite oxide, the method comprising
step 1 of obtaining an aqueous solution A of a raw material salt containing two or more metals including aluminum,
step 2 of obtaining an aqueous solution B of a soluble carbonate and/or a soluble hydrogen carbonate,
step 3 of mixing the aqueous solution A and the aqueous solution B to obtain precipitates of an aluminum-based composite oxide hydroxide, and
step 4 of subjecting the precipitates to heat treatment to obtain an alumina-based composite oxide.
9. The method according to item 8, wherein the aqueous solution B is an ammonium bicarbonate aqueous solution.

Advantageous Effects of Invention

The alumina-based composite oxide according to the present invention is characterized in that the alumina-based composite oxide has an initial crystallite diameter of 10 nm or less and an initial specific surface area of 80 m/ml or more;
the alumina-based composite oxide after calcination at 1200° C. for 3 hours in air has a specific surface area of 10 $m^2$/ml or more;
the alumina-based composite oxide has an initial mean pore size of 10 nm or more and 50 nm or less; and
the alumina-based composite oxide after calcination at 1200° C. for 3 hours in air has a pore volume retention rate of 10% or more, the retention rate being represented by $(P_1/P_0) \times 100$ wherein $P_0$ represents an initial pore volume in ml/g, and $P_1$ represents a pore volume in ml/g after calcination at 1200° C. for 3 hours in air.

The alumina-based composite oxide according to the present invention has an initial crystallite diameter of 10 nm or less, and alumina particles and particles of an oxide other than alumina (other metal oxide) are dispersed at the nano level in the composite oxide; thus, sintering of the particles of other metal oxide is suppressed. The alumina-based composite oxide also has a large initial specific surface area, and exhibits excellent heat resistance of the specific surface area. Additionally, because the initial pore volume is also small due to the small initial mean pore size, and heat resistance of the pore volume is excellent, the composite oxide does not become bulky. Specifically, because the alumina-based composite oxide according to the present invention has a large specific surface area, a small pore volume, and heat resistance of the specific surface area and the pore volume, the alumina-based composite oxide can reduce sintering of precious metal particles that serve as a catalyst and pressure loss due to the coating thickness of the honeycomb.

DESCRIPTION OF EMBODIMENTS

The following describes in detail the alumina-based composite oxide and the production method of the composite oxide according to the present invention. Unless otherwise specified, the "%" of the content in this specification indicates "wt %=mass %."

1. Alumina-Based Composite Oxide

The alumina-based composite oxide according to the present invention is useful as an exhaust-gas-purifying-catalyst support, and contains alumina as an essential component and also another oxide other than alumina (other metal oxide). Specifically, the alumina-based composite oxide according to the present invention can also be referred to as an alumina-containing composite oxide. The catalyst supported by the composite oxide includes precious metal catalysts.

Undergoing the process of the production method of the alumina-based composite oxide according to the present invention, which is described later, alumina particles and other metal oxide particles are dispersed at the nano level in the composite oxide, thereby reducing sintering of other metal oxide particles. The composite oxide also has a large specific surface area and a small pore volume, and heat resistance of the specific surface area and pore volume.

When the alumina content is high, the composite oxide noticeably exhibits the above-described characteristics. The alumina content is preferably 20% or more, more preferably 25% or more, and more preferably 30% or more. The upper limit of alumina content is, although not particularly limited thereto, preferably 96% or less, and more preferably 95% or less.

The alumina-based composite oxide according to the present invention contains alumina and other metal oxide as essential components, and elements other than aluminum include the following.

The component other than aluminum is preferably at least one oxide selected from the group consisting of 1) ceria, 2) zirconia, and 3) rare-earth oxides (however, excluding ceria and promethium oxide). These oxides may be contained singly, or in a combination.

When ceria is contained, the ceria content falls within the range of 0.1% or more and 50% or less, preferably 1% or more and 40% or less, and more preferably 10% or more and 37% or less.

When zirconia is contained, the zirconia content falls within the range of 0.1% or more and 80% or less, preferably 1% or more and 70% or less, and more preferably 5% or more and 65% or less.

Examples of the rare-earth elements include Y, Sc, and lanthanoid elements, such as La, Pr, and Nd. Of these rare-earth elements, La, Pr, Nd, and Y are preferable, and La, Nd, and Y are more preferable. When an oxide of a rare-earth element (rare-earth oxide) is contained, the oxide may be present, on an oxide basis, in an amount of 0.1% or more and 20% or less, preferably 0.5% or more and 15% or less, and more preferably 1% or more and 10% or less.

The alumina-based composite oxide according to the present invention may further contain, in addition to the elements described above, at least one oxide selected from A) an oxide of at least one element selected from the group consisting of In, Si, Sn, Bi, and P; B) an oxide of a transition metal (however, excluding rare-earth elements and precious metal elements); and C) an alkaline-earth metal oxide. These components A) to C) are hereinafter referred to as "others."

When these other oxides are contained, the lower limit is 0.1% or more on an oxide basis; although the upper limit is not particularly limited, other oxides may be contained in an amount of up to about 40%, preferably 30% or less, and particularly preferably 20% or less.

The transition metal element is, for example, at least one member selected from the group consisting of Ti, V, Cr, Mn, Fe, Co, Ni, Cu, Nb, Mo, Ta, and W. The alkaline-earth metal is, for example, at least one member selected from the group consisting of Mg, Ca, Sr, and Ba.

A preferable composition percentage of the alumina-based composite oxide of the present invention is any of the below-listed combinations that total up to 100%. Although not explicitly stated below, every case of the alumina-based composite oxide is allowed to contain unavoidable impurities.

(1) Preferably,
Alumina: 20% or more and 96% or less
Zirconia: 0% or more and 80% or less
Ceria: 0% or more and 50% or less
Rare-earth metals: 0% or more and 20% or less
Others: 0% or more and 40% or less
(2) More preferably,
Alumina: 25% or more and 93% or less
Zirconia: 0% or more and 80% or less
Ceria: 0% or more and 50% or less
Rare-earth metals: 0% or more and 20% or less
Others: 0% or more and 30% or less
(3) Most preferably,
Alumina: 30% or more and 90% or less
Zirconia: 0% or more and 65% or less
Ceria: 0% or more and 37% or less
Rare-earth metals: 0% or more and 10% or less
Others: 0% or more and 20% or less The desired characteristics of the alumina-based composite oxide are obtained by adding an oxide of at least one metal selected from zirconium, cerium, rare-earth elements, transition metal elements (however, excluding rare-earth elements and precious metal elements), alkaline-earth metals, In, Si, Sn, Bi, and P.

The characteristics obtained are described below and in the Examples (Table 1).

Specific Surface Area

The alumina-based composite oxide according to the present invention exhibits reduced sintering of other metal oxide particles because alumina particles and other metal oxide particles are dispersed at the nano level in the composite oxide. Thus, the alumina-based composite oxide has an initial specific surface area of 80 m²/ml or more and a specific surface area of 10 m²/ml or more after calcination at 1200° C. for 3 hours in the air, and exhibits high heat resistance.

The specific surface area was measured by a BET method with a specific surface area analyzer (FlowSorb II, produced by Micromeritics). The specific surface area is measured in units of m²/g and is converted to m²/ml by dividing the value in m²/g by the pore volume in units of ml/g. The initial specific surface area is preferably within the range of 80 m²/ml or more, more preferably 85 m²/ml or more, and particularly preferably 90 m²/ml or more.

The alumina-based composite oxide according to the present invention, after calcination at 1200° C. for 3 hours in the air, has a specific surface area of 10 m²/ml or more, more preferably 20 m²/ml or more, and particularly preferably 30 m²/ml or more. As used here, "initial" refers to the state in which a synthesized composite oxide has been pulverized after calcination (immediately after production). The degree of the retention of the specific surface area (retention rate) after calcination at 1200° C. for 3 hours in the air was calculated as described below.

The equation to calculate the retention rate of the specific surface area: $(S_1/S_0) \times 100$ in which $S_0$ represents an initial specific surface area (m²/ml), and $S_1$ represents a specific surface area (m²/ml) after calcination at 1200° C. for 3 hours in the air.

The specific surface area retention rate is preferably 15% or more, more preferably 17% or more, and particularly preferably 20% or more.

Pore Volume

The alumina-based composite oxide according to the present invention exhibits reduced sintering of other metal oxide particles because alumina particles and other metal oxide particles are dispersed at the nano level in the composite oxide. Thus, the pore volume also exhibits excellent heat resistance as with the specific surface area.

The pore volume and the pore size were measured by a BJH method with a Belsorp-mini II measurement device (produced by MicrotracBEL).

The initial pore volume is preferably within the range of 0.20 ml/g or more, more preferably 0.22 ml/g or more, and particularly preferably 0.25 ml/g or more. The pore volume after calcination at 1200° C. for 3 hours in the air is preferably 0.04 ml/g or more, more preferably 0.05 ml/g or more, and particularly preferably 0.06 ml/g or more. The degree of the retention of the pore volume after calcination at 1200° C. for 3 hours in the air (retention rate) was calculated as described below.

The equation to calculate the retention rate of the pore volume: $(P_1/P_0) \times 100$ in which $P_0$ represents an initial pore volume (ml/g) and $P_1$ represents a pore volume (ml/g) after calcination at 1200° C. for 3 hours in the air.

The retention rate of the pore volume of the present invention product may be 10% or more; within this range, the retention rate is preferably 15% or more, and more preferably 20% or more.

The proportion of the macropores (>50 nm) of the composite oxide of the present invention is small, preferably 50% or less, preferably 40% or less, more preferably 20% or less, and particularly preferably 5% or less.

The alumina-based composite oxide according to the present invention has an initial crystallite diameter of 10 nm or less because alumina particles and other metal oxide particles are dispersed at the nano level in the composite oxide. The preferable range of the initial crystallite diameter is not limited, and may be 3 to 9 nm.

Specifically, the greatest characteristic of the alumina-based composite oxide according to the present invention is that, despite the high specific surface area and sufficient heat resistance, the composite oxide can provide a powder with a low pore volume. The present invention product has an advantageous ability to increase the amount of the catalyst support inside the coating layer while reducing the initial thickness of the coating on the honeycomb.

2. Production Method of Alumina-Based Composite Oxide

The method for producing the alumina-based composite oxide according to the present invention comprises step 1 of obtaining an aqueous solution A of a raw material salt containing two or more metals including aluminum, step 2 of obtaining an aqueous solution B of a soluble carbonate and/or a soluble hydrogen carbonate, step 3 of mixing the aqueous solution A and the aqueous solution B to obtain precipitates of an aluminum-based composite hydroxide, and step 4 of subjecting the precipitates to heat treatment to obtain an alumina-based composite oxide.

The following describes each step of the production method of the present invention.

Step 1

In step 1, an aqueous solution A of a raw material salt containing two or more metals including aluminum is obtained.

The raw material salt containing aluminum is, for example, at least one member of aluminum nitrate, aluminum chloride, and the like. Of these, from the standpoint of reducing impurity residues, nitrate-based materials rather than chloride-based materials are preferable for the raw material salt.

The metal other than aluminum is, for example, at least one member of 1) cerium, 2) zirconium, and 3) rare-earth elements (however, excluding cerium and promethium).

The raw material salt containing cerium is, for example, at least one member of cerium nitrate, cerium chloride, cerium acetate, and the like. Of these, the nitrate-based material, cerium nitrate, is preferable.

The raw material salt containing zirconium is the material that can supply zirconium ions, and is, for example, at least one member of zirconium oxynitrate, zirconium oxychloride, zirconium nitrate, and the like. Of these, the nitrate-based material, zirconium oxynitrate, is preferable.

The rare-earth element is, for example, at least one member of Sc, Y, La, Nd, Pr, Sm, Eu, Gd, Tb, Dy, Ho, Er, Tm, and Lu.

The raw material salt may also contain, in addition to those described above, at least one member selected from the group consisting of A) at least one element selected from the group consisting of In, Si, Sn, Bi, and P; B) a transition metal element (however, excluding rare-earth elements and precious metal elements); and C) an alkaline-earth metal element.

Raw materials for rare-earth elements, transition metal elements (excluding rare-earth elements and precious metal elements), alkaline-earth metals, In, Si, Sn, Bi, and P are not particularly limited as long as the materials are water-soluble. Examples include nitrate, sulfate, acetate, chloride, and bromide; from the standpoint of reducing impurity residues, a preferable raw material salt is nitrate. These raw materials preferably have a purity of 95% or more, and more preferably 98% or more.

To prepare the aqueous solution A, the solvent may be suitably selected depending on the type of the raw material salt or the like. Typically, the solvent is preferably water (e.g., pure water and ion-exchanged water; the same applies hereinafter).

Subsequently, predetermined proportions of these compounds (metal salts) are mixed. The metal salt concentration of the aqueous solution A is 1 to 5% on an oxide basis. A metal salt concentration of less than 1% is not preferable because it takes time for treatment due to the low concentration, while a metal salt concentration of more than 5% is also not preferable because it results in insufficient stirring due to the increased viscosity during neutralization, making it difficult to form a composite.

Step 2

In step 2, an aqueous solution B of a soluble carbonate and/or a soluble hydrogen carbonate is obtained.

The soluble carbonate for use in the present invention includes ammonium carbonate, ammonium bicarbonate, sodium carbonate, and sodium hydrogen carbonate. From the standpoint of reducing impurity residues, ammonium carbonate and ammonium bicarbonate are preferable.

Subsequently, a soluble carbonate of a predetermined proportion is dispersed in water. The concentration of the aqueous solution B is 1 to 20%. A concentration of less than 1% is not preferable because it takes time for treatment due to the low concentration, while a concentration of more than 20% is also not preferable because it results in insufficient stirring due to the increased viscosity during neutralization, making it difficult to form a composite. The raw material preferably has a purity of 95% or more, and more preferably 98% or more.

Step 3

In step 3, the aqueous solution A and the aqueous solution B are mixed to obtain precipitates of an aluminum-based composite hydroxide. This hydroxide may contain a carbonate.

The solution obtained in the step 1 and the solution obtained in the step 2 are mixed and neutralized. Although mixing is not particularly limited, from the standpoint of productivity such as filterability in the subsequent step, it is preferable to add the nitrate aqueous solution prepared in the step 1 to the soluble carbonate dispersion.

The generated alumina-based composite hydroxide is collected by solid-liquid separation. The solid-liquid separation may be performed in accordance with a known method, such as filtration, centrifugation, and decantation.

After being collected, the alumina-based composite hydroxide may preferably be washed with water to remove adhered impurities as necessary.

The obtained alumina-based composite hydroxide may further be optionally dried. The drying method may be a known method, and may be of any methods, such as natural drying and drying by heating, for example. Additionally, if necessary, pulverization, classification, and the like may be performed after drying treatment.

Step 4

In step 4, the precipitates are subjected to heat treatment to obtain an alumina-based composite oxide.

The heat treatment step is performed. The heat treatment temperature is not particularly limited, and the heat treatment is typically performed at about 400 to 900° C. for 1 to 5 hours. The heat treatment atmosphere is not particularly limited, and heat treatment is typically performed in the air or in an oxidizing atmosphere.

The composite oxide obtained by the heat treatment may optionally be pulverized. Pulverization is not particularly limited, and the composite oxide may be pulverized with a typical pulverizer, such as a planetary mill, a ball mill, a hammer mill, or a jet mill.

EXAMPLES

The following describes the present invention in detail with reference to Examples and Comparative Example. However, the present invention is not limited to these Examples. Zirconium oxides in the alumina-based composite oxides obtained in the Examples and Comparative Example contained 1.3 to 2.5% of hafnium oxide as unavoidable impurities.

The physical properties of the alumina-based composite oxides obtained in the Examples and Comparative Example were measured by the following methods.

(1) Specific Surface Area

The specific surface area was measured by a BET method with a FlowSorb II (produced by Micromeritics) specific surface area analyzer.

(2) Pore Volume and Pore Diameter

The pore volume and pore size were measured by a BJH method with a Belsorp-mini II measurement device (produced by MicrotracBEL).

(3) Crystallite Diameter

The crystallite diameter was calculated using the Scherrer equation based on the results of measurement with a RINT-2500 X-ray diffractometer (produced by Rigaku Corporation).

(4) Composition Analysis

The composition was analyzed with an ICP-AES ULTIMA-2 (produced by Horiba Ltd.).

Example 1

A nitrate aqueous solution was prepared by dissolving aluminum nitrate nonahydrate (Wako Pure Chemical Industries, Ltd., special grade reagent, 28.0 g on an aluminum oxide basis), zirconium oxynitrate (Mitsuwa Chemicals Co., Ltd., special grade reagent, 23.0 g on a zirconium oxide basis), cerium(III) nitrate hexahydrate (Wako Pure Chemical Industries, Ltd., special grade reagent, 20.0 g on a cerium oxide basis), lanthanum nitrate hexahydrate (Wako Pure Chemical Industries, Ltd., 99%, 2.0 g on a lanthanum oxide basis), and neodymium(III) nitrate hydrate (Wako Pure Chemical Industries, Ltd., 99.99%, 2.0 g on a neodymium oxide basis) in ion-exchanged water to give 3% on an oxide basis.

Subsequently, 400 g of ammonium bicarbonate was dissolved in 7600 g of water, thereby preparing a 5% ammonium bicarbonate aqueous solution.

Subsequently, the nitrate aqueous solution was added to the ammonium bicarbonate aqueous solution, thereby obtaining precipitates of an aluminum-based composite hydroxide.

Subsequently, the precipitates were collected by solid-liquid separation, and the solids were calcined at 850° C. for 5 hours in the air in an electric furnace, thereby obtaining an alumina-based composite oxide.

The alumina-based composite oxide was pulverized with a hammer mill to prepare samples.

Example 2

A nitrate aqueous solution was prepared by dissolving aluminum nitrate nonahydrate (Wako Pure Chemical Industries, Ltd., special grade reagent, 28.0 g on an aluminum oxide basis), zirconium oxynitrate (Mitsuwa Chemicals Co., Ltd., special grade reagent, 40.0 g on a zirconium oxide basis), cerium(III) nitrate hexahydrate (Wako Pure Chemical Industries, Ltd., special grade reagent, 26.0 g on a cerium oxide basis), lanthanum nitrate hexahydrate (Wako Pure Chemical Industries, Ltd., 99%, 2.0 g on a lanthanum oxide basis), neodymium(III) nitrate hydrate (Wako Pure Chemical Industries, Ltd., 99.99%, 2.0 g on a neodymium oxide basis), and yttrium nitrate n hydrate (Wako Pure Chemical Industries, Ltd., 99.9%, 2.0 g on a yttrium oxide basis) in ion-exchanged water to give 3% on an oxide basis.

Subsequently, 400 g of ammonium bicarbonate was dissolved in 7600 g of water, thereby preparing a 5% ammonium bicarbonate aqueous solution.

Subsequently, the nitrate aqueous solution was added to the ammonium bicarbonate aqueous solution, thereby obtaining precipitates of an aluminum-based composite hydroxide.

Subsequently, the precipitates were collected by solid-liquid separation, and the solids were calcined at 850° C. for 5 hours in the air in an electric furnace, thereby obtaining an alumina-based composite oxide.

The alumina-based composite oxide was pulverized with a hammer mill to prepare samples.

Example 3

A nitrate aqueous solution was prepared by dissolving aluminum nitrate nonahydrate (Wako Pure Chemical Industries, Ltd., special grade reagent, 30.0 g on an aluminum oxide basis), zirconium oxynitrate (Mitsuwa Chemicals Co., Ltd., special grade reagent, 54.0 g on a zirconium oxide basis), lanthanum nitrate hexahydrate (Wako Pure Chemical Industries, Ltd., 99%, 6.0 g on a lanthanum oxide basis), neodymium(III) nitrate hydrate (Wako Pure Chemical Industries, Ltd., 99.99%, 4.0 g on a neodymium oxide basis), and yttrium nitrate n hydrate (Wako Pure Chemical Industries, Ltd., 99.9%, 6.0 g on a yttrium oxide basis) in ion-exchanged water to give 3% on an oxide basis.

Subsequently, 400 g of ammonium bicarbonate was dissolved in 7600 g of water, thereby preparing a 5% ammonium bicarbonate aqueous solution.

Subsequently, the nitrate aqueous solution was added to the ammonium bicarbonate aqueous solution, thereby obtaining precipitates of an aluminum-based composite hydroxide.

Subsequently, the precipitates were collected by solid-liquid separation, and the solids were calcined at 850° C. for 5 hours in the air in an electric furnace, thereby obtaining an alumina-based composite oxide.

The alumina-based composite oxide was pulverized with a hammer mill to prepare samples.

Example 4

A nitrate aqueous solution was prepared by dissolving aluminum nitrate nonahydrate (Wako Pure Chemical Industries, Ltd., special grade reagent, 30.0 g on an aluminum oxide basis), zirconium oxynitrate (Mitsuwa Chemicals Co., Ltd., special grade reagent, 64.0 g on a zirconium oxide basis), lanthanum nitrate hexahydrate (Wako Pure Chemical Industries, Ltd., 99%, 2.0 g on a lanthanum oxide basis), neodymium(III) nitrate hydrate (Wako Pure Chemical Industries, Ltd., 99.99%, 2.0 g on a neodymium oxide basis), and yttrium nitrate n hydrate (Wako Pure Chemical Industries, Ltd., 99.9%, 2.0 g on a yttrium oxide basis) in ion-exchanged water to give 3% on an oxide basis.

Subsequently, 400 g of ammonium bicarbonate was dissolved in 7600 g of water, thereby preparing a 5% ammonium bicarbonate aqueous solution.

Subsequently, the nitrate aqueous solution was added to the ammonium bicarbonate aqueous solution, thereby obtaining precipitates of an aluminum-based composite hydroxide.

Subsequently, the precipitates were collected by solid-liquid separation, and the solids were calcined at 850° C. for 5 hours in the air in an electric furnace, thereby obtaining an alumina-based composite oxide.

The alumina-based composite oxide was pulverized with a hammer mill to prepare samples.

Example 5

A nitrate aqueous solution was prepared by dissolving aluminum nitrate nonahydrate (Wako Pure Chemical Industries, Ltd., special grade reagent, 85.0 g on an aluminum oxide basis), zirconium oxynitrate (Mitsuwa Chemicals Co., Ltd., special grade reagent, 5.0 g on a zirconium oxide basis), and phosphoric acid (Wako Pure Chemical Industries, Ltd., special grade reagent, 10.0 g on a phosphorus pentoxide basis) in ion-exchanged water to give 3% on an oxide basis.

Subsequently, 400 g of ammonium bicarbonate was dissolved in 7600 g of water, thereby preparing a 5% ammonium bicarbonate aqueous solution.

Subsequently, the nitrate aqueous solution was added to the ammonium bicarbonate aqueous solution, thereby obtaining precipitates of an aluminum-based composite hydroxide.

Subsequently, the precipitates were collected by solid-liquid separation, and the solids were calcined at 850° C. for 5 hours in the air in an electric furnace, thereby obtaining an alumina-based composite oxide.

The alumina-based composite oxide was pulverized with a hammer mill to prepare samples.

Example 6

A nitrate aqueous solution was prepared by dissolving aluminum nitrate nonahydrate (Wako Pure Chemical Industries, Ltd., special grade reagent, 35.0 g on an aluminum oxide basis), zirconium oxynitrate (Mitsuwa Chemicals Co., Ltd., special grade reagent, 25.0 g on a zirconium oxide basis), cerium(III) nitrate hexahydrate (Wako Pure Chemical Industries, Ltd., special grade reagent, 20.0 g on a cerium oxide basis), and barium nitrate (Wako Pure Chemical Industries, Ltd., special grade reagent, 5.0 g on a barium oxide basis) in ion-exchanged water to give 3% on an oxide basis.

Subsequently, 400 g of ammonium bicarbonate was dissolved in 7600 g of water, thereby preparing a 5% ammonium bicarbonate aqueous solution.

Subsequently, the nitrate aqueous solution was added to the ammonium bicarbonate aqueous solution, thereby obtaining precipitates of an aluminum-based composite hydroxide.

Subsequently, the precipitates were collected by solid-liquid separation, and the solids were calcined at 850° C. for 5 hours in the air in an electric furnace, thereby obtaining an alumina-based composite oxide.

The alumina-based composite oxide was pulverized with a hammer mill to prepare samples.

Example 7

A nitrate aqueous solution was prepared by dissolving aluminum nitrate nonahydrate (Wako Pure Chemical Industries, Ltd., special grade reagent, 62.5 g on an aluminum oxide basis), zirconium oxynitrate (Mitsuwa Chemicals Co., Ltd., special grade reagent, 12.5 g on a zirconium oxide basis), cerium(III) nitrate hexahydrate (Wako Pure Chemical Industries, Ltd., special grade reagent, 10.0 g on a cerium oxide basis), and barium nitrate (Wako Pure Chemical Industries, Ltd., special grade reagent, 15.0 g on a barium oxide basis) in ion-exchanged water to give 3% on an oxide basis.

Subsequently, 400 g of ammonium bicarbonate was dissolved in 7600 g of water, thereby preparing a 5% ammonium bicarbonate aqueous solution.

Subsequently, the nitrate aqueous solution was added to the ammonium bicarbonate aqueous solution, thereby obtaining precipitates of an aluminum-based composite hydroxide.

Subsequently, the precipitates were collected by solid-liquid separation, and the solids were calcined at 850° C. for 5 hours in the air in an electric furnace, thereby obtaining an alumina-based composite oxide.

The alumina-based composite oxide was pulverized with a hammer mill to prepare samples.

Example 8

A nitrate aqueous solution was prepared by dissolving aluminum nitrate nonahydrate (Wako Pure Chemical Industries, Ltd., special grade reagent, 30.0 g on an aluminum oxide basis), zirconium oxynitrate (Mitsuwa Chemicals Co., Ltd., special grade reagent, 41.9 g on a zirconium oxide basis), cerium(III) nitrate hexahydrate (Wako Pure Chemical Industries, Ltd., special grade reagent, 22.0 g on a cerium oxide basis), lanthanum nitrate hexahydrate (Wako Pure Chemical Industries, Ltd., 99%, 5.0 g on a lanthanum oxide basis), and iron(III) nitrate nonahydrate (Wako Pure Chemical Industries, Ltd., 99.99%, 0.1 g on an iron oxide basis) in ion-exchanged water to give 3% on an oxide basis.

Subsequently, 400 g of ammonium bicarbonate was dissolved in 7600 g of water, thereby preparing a 5% ammonium bicarbonate aqueous solution.

Subsequently, the nitrate aqueous solution was added to the ammonium bicarbonate aqueous solution, thereby obtaining precipitates of an aluminum-based composite hydroxide.

Subsequently, the precipitates were collected by solid-liquid separation, and the solids were calcined at 850° C. for 5 hours in the air in an electric furnace, thereby obtaining an alumina-based composite oxide.

The alumina-based composite oxide was pulverized with a hammer mill to prepare samples.

Example 9

A nitrate aqueous solution was prepared by dissolving aluminum nitrate nonahydrate (Wako Pure Chemical Industries, Ltd., special grade reagent, 30.0 g on an aluminum oxide basis), zirconium oxynitrate (Mitsuwa Chemicals Co., Ltd., special grade reagent, 41.5 g on a zirconium oxide basis), cerium(III) nitrate hexahydrate (Wako Pure Chemical Industries, Ltd., special grade reagent, 22.0 g on a cerium oxide basis), lanthanum nitrate hexahydrate (Wako Pure Chemical Industries, Ltd., 99%, 5.0 g on a lanthanum oxide basis), and iron(III) nitrate nonahydrate (Wako Pure Chemical Industries, Ltd., 99.99%, 0.5 g on an iron oxide basis) in ion-exchanged water to give 3% on an oxide basis.

Subsequently, 400 g of ammonium bicarbonate was dissolved in 7600 g of water, thereby preparing a 5% ammonium bicarbonate aqueous solution.

Subsequently, the nitrate aqueous solution was added to the ammonium bicarbonate aqueous solution, thereby obtaining precipitates of an aluminum-based composite hydroxide.

Subsequently, the precipitates were collected by solid-liquid separation, and the solids were calcined at 850° C. for 5 hours in the air in an electric furnace, thereby obtaining an alumina-based composite oxide.

The alumina-based composite oxide was pulverized with a hammer mill to prepare samples.

Example 10

A nitrate aqueous solution was prepared by dissolving aluminum nitrate nonahydrate (Wako Pure Chemical Industries, Ltd., special grade reagent, 25.0 g on an aluminum oxide basis), zirconium oxynitrate (Mitsuwa Chemicals Co., Ltd., special grade reagent, 26.0 g on a zirconium oxide basis), cerium(III) nitrate hexahydrate (Wako Pure Chemical Industries, Ltd., special grade reagent, 41.0 g on a cerium oxide basis), lanthanum nitrate hexahydrate (Wako Pure Chemical Industries, Ltd., 99%, 4.0 g on a lanthanum oxide basis), and yttrium(III) nitrate hydrate (Wako Pure Chemical Industries, Ltd., 99.99%, 4.0 g on a yttrium oxide basis) in ion-exchanged water to give 3% on an oxide basis.

Subsequently, 400 g of ammonium bicarbonate was dissolved in 7600 g of water, thereby preparing a 5% ammonium bicarbonate aqueous solution.

Subsequently, the nitrate aqueous solution was added to the ammonium bicarbonate aqueous solution, thereby obtaining precipitates of an aluminum-based composite hydroxide.

Subsequently, the precipitates were collected by solid-liquid separation, and the solids were calcined at 850° C. for 5 hours in the air in an electric furnace, thereby obtaining an alumina-based composite oxide.

The alumina-based composite oxide was pulverized with a hammer mill to prepare samples.

Example 11

A nitrate aqueous solution was prepared by dissolving aluminum nitrate nonahydrate (Wako Pure Chemical Industries, Ltd., special grade reagent, 20.0 g on an aluminum oxide basis), zirconium oxynitrate (Mitsuwa Chemicals Co., Ltd., special grade reagent, 40.0 g on a zirconium oxide basis), cerium(III) nitrate hexahydrate (Wako Pure Chemical Industries, Ltd., special grade reagent, 36.0 g on a cerium oxide basis), lanthanum nitrate hexahydrate (Wako Pure Chemical Industries, Ltd., 99%, 2.0 g on a lanthanum oxide basis), and neodymium(III) nitrate hydrate (Wako Pure Chemical Industries, Ltd., 99.99%, 2.0 g on a neodymium oxide basis) in ion-exchanged water to give 3% on an oxide basis.

Subsequently, 400 g of ammonium bicarbonate was dissolved in 7600 g of water, thereby preparing a 5% ammonium bicarbonate aqueous solution.

Subsequently, the nitrate aqueous solution was added to the ammonium bicarbonate aqueous solution, thereby obtaining precipitates of an aluminum-based composite hydroxide.

Subsequently, the precipitates were collected by solid-liquid separation, and the solids were calcined at 850° C. for 5 hours in the air in an electric furnace, thereby obtaining an alumina-based composite oxide.

The alumina-based composite oxide was pulverized with a hammer mill to prepare samples.

Comparative Example 1

A nitrate aqueous solution was prepared by dissolving aluminum nitrate nonahydrate (Wako Pure Chemical Industries, Ltd., special grade reagent, 20.0 g on an aluminum oxide basis), zirconium oxynitrate (Mitsuwa Chemicals Co., Ltd., special grade reagent, 40.0 g on a zirconium oxide basis), cerium(III) nitrate hexahydrate (Wako Pure Chemical Industries, Ltd., special grade reagent, 36.0 g on a cerium oxide basis), lanthanum nitrate hexahydrate (Wako Pure Chemical Industries, Ltd., 99%, 2.0 g on a lanthanum oxide basis), and neodymium(III) nitrate hydrate (Wako Pure Chemical Industries, Ltd., 99.99%, 2.0 g on a neodymium oxide basis) in ion-exchanged water to give 3% on an oxide basis.

Subsequently, the nitrate aqueous solution was added to ammonium hydroxide, thereby obtaining precipitates of an aluminum-based composite hydroxide.

Subsequently, the precipitates were collected by solid-liquid separation, and the solids were calcined at 500° C. for 5 hours in the air in an electric furnace, thereby obtaining an alumina-based composite oxide.

The alumina-based composite oxide was pulverized with a hammer mill to prepare samples.

TABLE 1

| Item | Unit | Example 1 | Example 2 | Example 3 | Example 4 | Example 5 | Example 6 | Example 7 | Example 8 | Example 9 | Example 10 | Example 11 | Comparative Example 1 |
|---|---|---|---|---|---|---|---|---|---|---|---|---|---|
| $Al_2O_3$ | wt % | 53.0 | 30.0 | 30.0 | 30.0 | 85.0 | 35.0 | 62.5 | 30.0 | 30.0 | 25.0 | 20.0 | 20.0 |
| $ZrO_2$ | wt % | 23.0 | 40.0 | 54.0 | 64.0 | 5.0 | 25.0 | 12.5 | 41.9 | 41.5 | 26.0 | 40.0 | 40.0 |
| $CeO_2$ | wt % | 20.0 | 24.0 | — | — | — | 20.0 | 10.0 | 22.0 | 22.0 | 41.0 | 36.0 | 36.0 |
| $La_2O_3$ | wt % | 2.0 | 2.0 | 6.0 | 2.0 | — | — | — | 5.0 | 5.0 | 4.0 | 2.0 | 2.0 |
| $Nd_2O_3$ | wt % | 2.0 | 2.0 | 4.0 | 2.0 | — | — | — | — | — | — | 2.0 | 2.0 |
| $Y_2O_3$ | wt % | — | 2.0 | 6.0 | 2.0 | — | — | — | 1.0 | 1.0 | 4.0 | — | — |
| $Pr_6O_{11}$ | wt % | — | — | — | — | — | — | — | — | — | — | — | — |
| Others | wt % | — | — | — | — | $PO_4$ = 10.0 | BaO = 20.0 | BaO = 15.0 | $Fe_2O_3$ = 0.1 | $Fe_2O_3$ = 0.5 | — | — | — |
| Specific Surface Area (Initial) | $m^2/g$ | 120 | 65 | 57 | 52 | 254.1 | 112 | 160.7 | 136.4 | 132.6 | 69.8 | 103.9 | 98.8 |
| Specific Surface Area 1200° C. × 3 hr | $m^2/g$ | 22.2 | 9.1 | 6.5 | 14.5 | 57.9 | 3.9 | 10.6 | 14 | 11 | 19.5 | 9.6 | 0.8 |
| Pore Volume (Initial) | ml/g | 0.66 | 0.37 | 0.25 | 0.56 | 1.89 | 0.25 | 0.45 | 0.77 | 0.77 | 0.65 | 0.46 | 0.16 |
| Pore Volume 1200° C. × 3 hr | ml/g | 0.16 | 0.09 | 0.06 | 0.19 | 0.72 | 0.06 | 0.17 | 0.27 | 0.30 | 0.23 | 0.11 | 0.01 |
| Pore Volume Retention Rate 1200° C. × 3 hr | % | 24.2 | 24.3 | 24.0 | 33.9 | 38.1 | 23.7 | 37.5 | 34.9 | 38.7 | 35.4 | 23.9 | 6.3 |
| Specific Surface Area (Initial) | $m_2/ml$ | 181.8 | 175.7 | 228.0 | 92.9 | 134.4 | 443.2 | 354.0 | 176.4 | 171.3 | 107.4 | 225.9 | 617.5 |
| Specific Surface Area 1200° C. × 3 hr | $m_2/ml$ | 138.8 | 101.1 | 108.3 | 76.3 | 80.4 | 67.0 | 62.4 | 51.9 | 36.7 | 84.8 | 87.3 | 80.0 |
| Specific Surface Area Retention Rate 1200° C. × 3 hr | % | 76.3 | 57.6 | 47.5 | 82.2 | 59.9 | 15.1 | 17.6 | 29.4 | 21.4 | 79.0 | 38.6 | 13.0 |
| Crystallite Diameter (Initial) | nm | 7 | 8 | 9 | 9 | 5 or less | 7 | 5 or less | 7 | 7 | 8 | 5 | 5 |
| Crystallite Diameter 1200° C. × 3 hr | nm | 10 | 20 | 33 | 32 | — | — | — | 16 | 20 | 16 | — | — |
| Mean Pore Size (Initial) | nm | 19 | 21 | 16 | 19 | 21.3 | 8.2 | 10.7 | 18.5 | 16.1 | 28.1 | 47 | 4.9 |
| Proportion of Macropores (Initial) | % | 17.1 | 16.8 | 8.9 | 39.9 | 20.6 | 3.0 | 2.4 | 9.9 | 10.5 | 18.6 | 18.8 | 0.8 |

The invention claimed is:

1. An alumina-based composite oxide, characterized in that the alumina-based composite oxide has an initial crystallite diameter of 10 nm or less and an initial specific surface area of 80 $m^2$/ml or more;

the alumina-based composite oxide after calcination at 1200° C. for 3 hours in air has a specific surface area of 10 $m^2$/ml or more;

the alumina-based composite oxide has an initial mean pore size of 10 nm or more and 50 nm or less; and the alumina-based composite oxide after calcination at 1200° C. for 3 hours in air has a pore volume retention rate of 10% or more, the pore volume retention rate being represented by $(P_1/P_0) \times 100$ wherein $P_0$ represents an initial pore volume in ml/g, and $P_1$ represents a pore volume in ml/g after calcination at 1200° C. for 3 hours in air.

2. The alumina-based composite oxide according to claim 1, wherein after calcination at 1200° C. for 3 hours in air, a specific surface area retention rate is 15% or more, the specific surface area retention rate being determined by $(S_1/S_0) \times 100$ wherein $S_0$ represents an initial specific surface area in $m^2$/ml, and Si represents a specific surface area in $m^2$/ml after calcination at 1200° C. for 3 hours in air.

3. The alumina-based composite oxide according to claim 1, wherein the alumina-based composite oxide contains alumina in an amount of 20 wt % or more and 96 wt % or less based on a total content of the alumina-based composite oxide.

4. The alumina-based composite oxide according to claim 1, comprising alumina and at least one oxide selected from the group consisting of 1) ceria, 2) zirconia, and 3) rare-earth oxides except for ceria and promethium oxide.

5. The alumina-based composite oxide according to claim 1, comprising alumina and at least one oxide selected from the group consisting of
A) an oxide of at least one element selected from the group consisting of In, Si, Sn, Bi, and P,
B) an oxide of a transition metal except for rare-earth elements and precious metal elements, and
C) an alkaline-earth metal oxide,
wherein the total content of the oxides represented by A) to C) is 0.1 wt % or more and 40 wt % or less based on a total content of the alumina-based composite oxide.

6. The alumina-based composite oxide according to claim 5, wherein the oxide of a transition metal is an oxide of at least one element selected from the group consisting of Ti, V, Cr, Mn, Fe, Co, Ni, Cu, Nb, Mo, Ta, and W.

7. The alumina-based composite oxide according to claim 5, wherein the alkaline-earth metal oxide is an oxide of at least one element selected from the group consisting of Mg, Ca, Sr, and Ba.

* * * * *